US007796055B2

(12) United States Patent
Clark et al.

(10) Patent No.: US 7,796,055 B2
(45) Date of Patent: Sep. 14, 2010

(54) RUNWAY STATUS INDICATION AND TRAFFIC INFORMATION DISPLAY AND FILTERING

(75) Inventors: Samuel T. Clark, Federal Way, WA (US); Michael P. Snow, Langley, WA (US); Roglenda R. Bowe, Maple Valley, WA (US); Howard F. Au, Seattle, WA (US)

(73) Assignee: The Boeing Company, Chicago, IL (US)

( * ) Notice: Subject to any disclaimer, the term of this patent is extended or adjusted under 35 U.S.C. 154(b) by 986 days.

(21) Appl. No.: 11/555,884

(22) Filed: Nov. 2, 2006

(65) Prior Publication Data

US 2008/0106438 A1 May 8, 2008

(51) Int. Cl.
*G01C 23/00* (2006.01)

(52) U.S. Cl. ....................... 340/972; 340/945; 340/951; 340/958; 342/29; 244/75.1; 701/16; 701/121; 701/301

(58) Field of Classification Search ................. 340/972, 340/945, 951, 952, 958, 959, 961, 988, 989; 342/455, 30, 29 R; 244/75.1, 76 R; 701/9, 701/14, 16, 20, 121, 301, 245
See application file for complete search history.

(56) References Cited

U.S. PATENT DOCUMENTS

| | | | | |
|---|---|---|---|---|
| 6,927,701 | B2 * | 8/2005 | Schmidt et al. | 340/959 |
| 6,950,037 | B1 * | 9/2005 | Clavier et al. | 340/945 |
| 6,957,130 | B1 * | 10/2005 | Horvath et al. | 701/3 |
| 7,222,017 | B2 | 5/2007 | Clark et al. | |
| 7,253,748 | B2 * | 8/2007 | Nitzan et al. | 340/945 |
| 7,385,527 | B1 * | 6/2008 | Clavier et al. | 340/945 |
| 7,555,372 | B2 * | 6/2009 | Dwyer | 701/16 |
| 7,663,507 | B2 * | 2/2010 | Nitzan et al. | 340/952 |
| 2006/0259232 | A1 * | 11/2006 | Huthoefer et al. | 701/120 |
| 2007/0100499 | A1 * | 5/2007 | Staub | 700/245 |

* cited by examiner

*Primary Examiner*—Davetta W Goins
(74) *Attorney, Agent, or Firm*—Lee & Hayes, PLLC

(57) ABSTRACT

Systems and methods for runway status indication and related traffic information displays and filtering are disclosed. In one embodiment, the method for displaying runway status includes defining a monitored volume for each of one or more runways, determining a runway status for each of the one or more runways based on at least one of a state of at least one traffic vehicle and a monitoring vehicle state with respect to each monitored volume. The method continues with selecting at least one runway status for display based on the state of the monitoring vehicle. The method then presents the at least one runway status within the monitoring vehicle. In an additional embodiment, each monitored volume is based on a length of a corresponding runway, a width of the corresponding runway, and a predetermined altitude above the corresponding runway.

20 Claims, 5 Drawing Sheets

RUNWAY STATUS INDICATION AND TRAFFIC INFORMATION DISPLAY AND FILTERING

FIELD OF THE INVENTION

This invention relates to systems and methods for determining and displaying runway status, and more specifically, to systems and methods for filtering and displaying runway status indication and related traffic information.

BACKGROUND OF THE INVENTION

Runway incursions are a major problem and a top commercial aviation safety concern. This problem exists in all conditions, but is exacerbated by low and reduced visibility conditions, such as at night or in instrument meteorological conditions (IMC). Runway incursions decrease surface operations safety, and increase the risk of an on-ground traffic conflict and related aircraft incident or accident. Currently, aircraft pilots or ground vehicle operators often have little or no first-hand information for determining what traffic is a problem or poses a potential problem. For example, airport moving map displays are provided by the Electronic Flight Bag (EFB) on aircraft such as the Boeing 777, and are integral with the navigation displays planned for Boeing the 787. However, these current airport moving maps only display an aircraft's own position, not runway status or traffic information. Pilot awareness of runway status (e.g., unoccupied, occupied, in-use, restricted, etc.), as well as pilot awareness of related traffic information relevant to the movement of his or her aircraft, can prevent or mitigate runway incursions and traffic conflicts.

Current airport moving maps with ownship position provide desirable safety benefits, but do not provide runway traffic information and runway status. Instead, pilots must rely on information/communication from air traffic control (ATC) and/or radio transmissions that may be missed, untimely, incomplete or inaccurate. Therefore, novel systems and methods that provide pilots a quick, easy, and unambiguous way to determine runway status and traffic conflicts or potential conflicts during taxi, takeoff, and approach/landing, provide increased safety benefit, and would have utility.

SUMMARY OF THE INVENTION

The present invention is directed to systems and methods for filtering and displaying runway status indication and traffic information. Embodiments of systems and methods in accordance with the present invention can advantageously provide pilots with quick, easy and unambiguous ways to reliably determine runway status and traffic threats during taxi, takeoff, and approach or landing. In comparison with the prior art, these embodiments can reduce the potential for runway related traffic conflicts and increase surface operations safety.

In one embodiment, a method for displaying runway status includes defining a monitored volume for each of one or more runways, determining a runway status for each of the one or more runways based on at least one of a state of at least one traffic vehicle and a monitoring vehicle state with respect to each monitored volume. The method continues with selecting at least one runway status for display based on the state of the monitoring vehicle. The method then presents the at least one runway status within the monitoring vehicle. In an additional embodiment, each monitored volume is based on a length of a corresponding runway, a width of the corresponding runway, and a predetermined altitude above the corresponding runway. In a further embodiment, the state of the at least one traffic vehicle is obtained from at least one of automatic surveillance traffic information, air traffic control radar traffic information, ground vehicle traffic information, and airport map database information. In another embodiment, presenting the at least one runway status includes displaying the runway status by at least one of a corresponding graphical indicator and a corresponding alphanumeric indicator, and further includes displaying each of the one or more traffic vehicles associated with the runway status by a corresponding symbology. An aural signal may also be presented to indicate runway status. In additional embodiments, the state of a traffic vehicle may include a position of the traffic vehicle in a corresponding monitored volume, a speed, a heading, an altitude, a thrust, a track, and a travel of the traffic vehicle. Furthermore, the monitoring vehicle state may include a position of the monitoring vehicle in a corresponding monitored volume, a speed, a heading, an altitude, a thrust, a track, and a travel of the monitoring vehicle.

In another preferred embodiment, a system is presented for displaying runway status that includes an evaluator component configured for determining a runway status for each of one or more runways based on at least one of a state of at least one traffic vehicle and a monitoring vehicle state with respect to a corresponding monitored volume, a selector component configured to select at least one runway status for display, and a presentation component configured to present the at least one runway status within the monitoring vehicle.

BRIEF DESCRIPTION OF THE DRAWINGS

Embodiments of the present invention are described in detail below with reference to the following drawings.

DETAILED DESCRIPTION

The present invention relates to systems and methods for filtering and displaying runway status indication and related traffic information. Many specific details of certain embodiments of the invention are set forth in the following description and in FIGS. 1-5 to provide an understanding of such embodiments. The present invention may have additional embodiments, or may be practiced without one or more of the details described below.

Generally, embodiments of systems and methods in accordance with the present invention provide systems and methods that determine the runway status of the one or more runways, filter the resultant runway status for one or more significant runway status, and display the significant runway status and the related traffic within a vehicle. Thus embodiments of the runway status indication and traffic information system can increase pilot awareness of runway status and traffic vehicles, advantageously reduce the potential for runway related traffic conflicts, and thereby increase surface operations safety.

Figure 1:
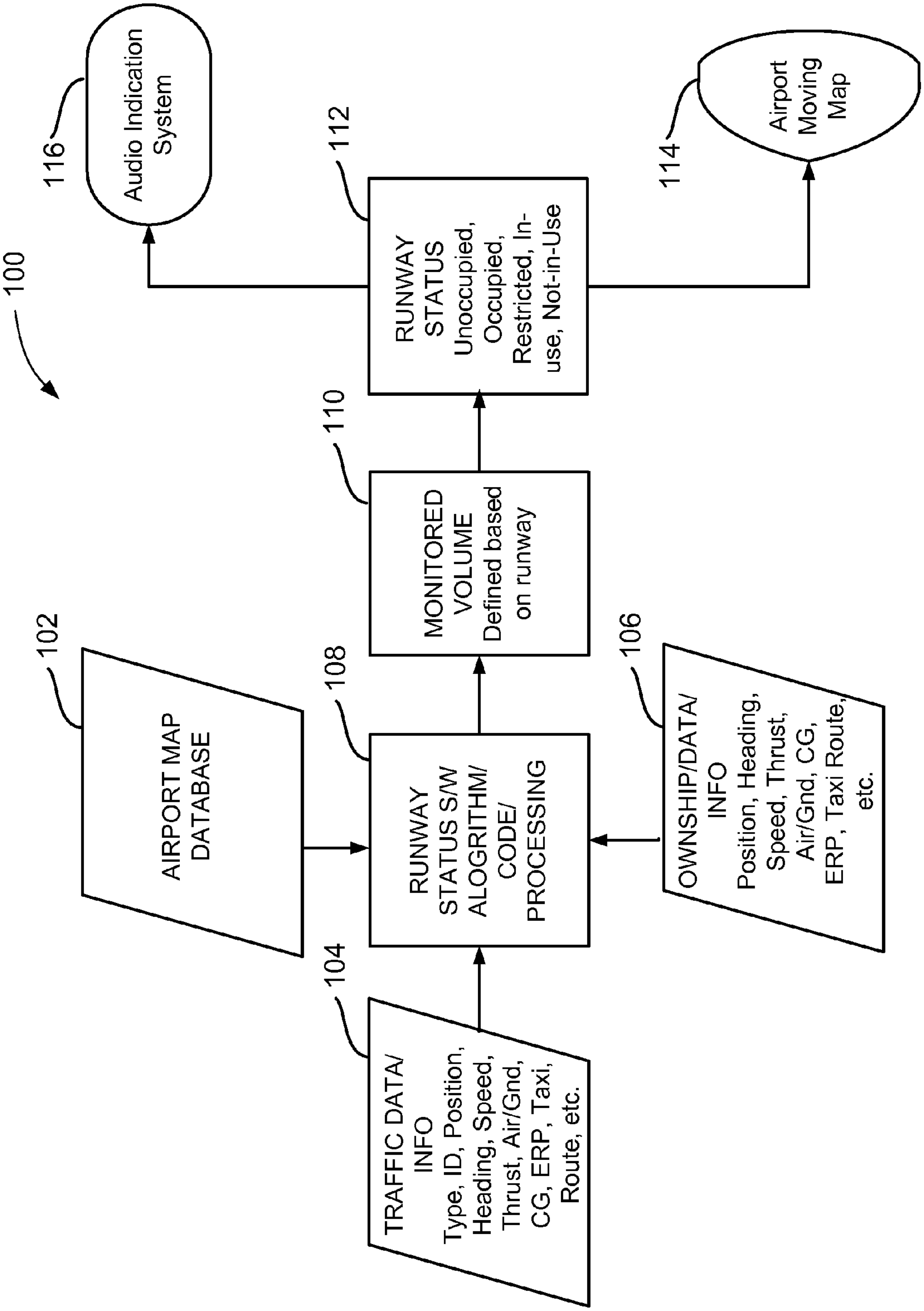
FIG. 1 is a schematic representation of the architectural concepts of a runway status indication system in accordance with an embodiment of the invention.

FIG. 1 is a schematic representation of the architectural concepts of a runway status indication system 100 for an aircraft in accordance with an embodiment of the invention. In this embodiment, the runway status processor module 108 of the system 100 receives airport map data information 102, traffic data/information 104, and the ownship data/information 106. The runway status processor module 108 then processes the collective data to define one or more monitored volumes 110 for the corresponding runways, and determine one or more runway status 112 for display on an airport moving map 114. In a further embodiment, an audio indicator system 116 may also be provided. The audio indicator system 116 may present aural reports of runway status 114, e.g., “Unoccupied”, “Occupied”, “In-use”, “Not-in-Use”, and “Restricted”, by representative tones or human speech. The tones and human speech may further provide information regarding the type of traffic vehicles associated with each of the one or more runway status.

With continued reference to FIG. 1, in one embodiment, traffic data/information 104 and ownship data/information 106 may be obtained, for example, from automatic dependent surveillance broadcast (ADS-B) traffic information, air traffic control (ATC) radar traffic information, ground vehicle traffic information, and airport map database information.

Traffic data/information 104 includes data regarding the type, identification, position, speed, thrust, and taxi route of one or more vehicles, as well as data as to whether each vehicle is on the ground or airborne. In particular, due to the large dimensions of some traffic vehicles, e.g., commercial passenger aircraft, the position of each traffic vehicle may be further defined as the operator eye reference point (ERP) in each vehicle. In other words, the position of a traffic vehicle may be further pinpointed as the position within the vehicle occupied by the operator. In alternative embodiments, the position of a traffic vehicle may also be further defined as the vehicle’s center of gravity (CG). For example, for a traffic vehicle that is an aircraft, the position of a traffic vehicle may be further pinpointed to the approximate longitudinal and bilateral center of the aircraft’s fuselage. Nevertheless, it will be appreciated that the position of a traffic vehicle may also be defined in alternative ways, such as by an imaginary envelope encompassing the most distal point or points of the traffic vehicle.

As further illustrated in FIG. 1, ownship data/information 106 includes data regarding the type, identification, position, heading, speed, thrust, taxi route, as well as data as to whether the aircraft is on ground or airborne. Once again, the position of ownship, or an aircraft equipped with the indication system 100, may be defined as the operator (pilot) eye reference point (ERP), as well as the aircraft’s center of gravity (CG), or other suitable alternatives, such as by an imaginary envelope encompassing the most distal point or points of the aircraft. Furthermore, FIG. 1 also illustrates that runway status 110, as provided by the runway status processor module 108, may indicate whether the runway status is one of Unoccupied, Occupied, In-Use (meaning use by an ownship may be limited), Not-in-Use (meaning available for use by an ownship), or Restricted (meaning not available for use by an ownship). With respect to these status indicators, “use by an ownship” refers to such operations as runway crossing, runway taxi, takeoff or approach and landing.

In general, the runway status processor module 108 determines runway status 110 for each runway based on one or more traffic vehicle positions, ownship position, and a monitored volume 110 defined around each airport runway. Information for defining a monitored volume with respect to each runway may be supplied by an Airport Map Database 102. In a particular embodiment, the three dimensional monitored volume is established with respect to the length of the runway, the width of the runway, and a predetermined height above the runway. In a further embodiment, the monitored volume dimensions extend approximately +/−200' left and right of runway centerline, extend approximately 20,000' beyond each runway threshold, and extend to an altitude of approximately 1000' above ground level. In an additional embodiment, the dimensions and the shape of the monitored volume may be varied as a function of estimated, calculated or required time of traffic or ownship arrival to the runway corresponding to the monitored volume. Nevertheless, it will be appreciated that the dimensions and the shape of the monitored volume may also be varied to support effective implementation, such as to accommodate operational needs, unusual or non-linear airport runway, taxiway, approach and departure path configurations, as well as for other applications such as traffic display/filtering and traffic conflict alerting.

Moreover, a plurality of logic algorithms and parameters may be used to determine runway status. First, runway status for a particular runway is defined as “Occupied” when at least one traffic vehicle is in the runway’s corresponding monitored volume and the traffic vehicle’s speed is less than or equal to a maximum threshold. In one embodiment, the maximum threshold is less than or equal to 50 knots. In another embodiment, a runway is determined to be “Occupied” when it intersects “ownship runway” and the ground speed of at least one traffic vehicle present in the runway’s monitored volume is greater than zero, but is less than or equal to a maximum threshold. For this purpose, a runway is an “ownship runway” when ownship is in a monitored volume corresponding to the runway, and ownship heading is aligned within 30 degrees of the runway heading. However, it will be appreciated that “ownship runway” may also be any runway that the ownship is using for taxi, takeoff, or landing.

Second, the runway status for a particular runway is defined as “In-use” when the positions of one or more traffic vehicles, regardless of ground or airborne status, are in the corresponding monitored volume of the runway and the speed of at least one traffic vehicle is greater than a minimum threshold. In one embodiment, the minimum threshold is greater than 50 knots. Nevertheless, in another embodiment, a runway is also determined to be “In-Use” when positions of ownship and at least one traffic vehicle, headings of ownship and at least one traffic vehicle, tracks of ownship and at least one traffic vehicle, and/or travel of ownship and at least one traffic vehicle indicate that the at least one traffic vehicle and ownship intersect, potentially intersect, or otherwise conflict with each other in a hazardous manner.

Third, a runway is generally determined to be “Not-In-Use” when the positions, headings, tracks, or travel of ownship and all traffic vehicles are such that they do not or cannot potentially intersect or otherwise conflict with each other in a hazardous manner. In a particular embodiment, combinations of one or more additional factors, such as the ground speed of ownship and one or more traffic vehicles, the airspeed of ownship and one or more traffic vehicles, the altitude of ownship and one or more traffic vehicles, the distances between ownship and one or more traffic vehicles, the thrust setting of ownship and one or more traffic vehicles, as well as variation in these factors, may be used to determine whether a runway is “Not-In-Use”. In other embodiments, these factors may be further combined with other relevant information, such as the power mode (e.g., on/standby) of the Traffic Collision Avoidance System (TCAS) in the one or more traffic vehicles and ownship, as well as the usage status of runway Land and Hold Short Operations (LAHSO), to ascertain whether a runway, or a runway portion, is "Not-In-Use". Moreover, it will be appreciated that in order to minimize inaccurate "Not-In-Use" status indication, factors such as whether a traffic vehicle is aligned within a predetermined degrees of the runway heading (e.g., 30 degrees), ownship heading, ownship track, and ownship ground speed may be used as determinative factors. Lastly, a simple time delay may also be used to filter out one or more traffic vehicles that only momentarily have the potential to intersect ownship or trigger runway status.

Fourth, a runway is generally determined to be "Unoccupied" when no traffic vehicle is present in the monitored volume corresponding to the runway. However, in another embodiment, a runway may be considered "Unoccupied" when all traffic vehicles within the monitored volume are no longer factors to be monitored by ownship (e.g., when all departing traffic vehicles lift off the runway or pass the end of the runway).

Fifth, a runway is generally determined to be "Restricted" when the positions, headings, tracks, or travel of ownship and at least one traffic vehicle are such that an imminent or hazardous traffic conflict/collision between at least one traffic vehicle and ownship exists, or could exist if ownship is to enter the runway's corresponding monitored volume. For example, a runway is determined to be "Restricted" when at least one traffic vehicle is in the monitored volume, the at least one traffic vehicle is below a predetermined altitude and above a predetermined speed, and the distance between the at least one traffic vehicle and ownship is decreasing. In one embodiment, the predetermined altitude is 300 feet and the predetermined speed is 50 knots. However, in another embodiment, in addition to satisfying the above criteria, the headings of the at least one traffic vehicle must also be within predetermined degrees of runway heading, such as 30 degrees, in order to trigger a "Restricted" status indication. This prevents inaccurate or false "Restricted" status indications. In another embodiment, a simple time delay may also be used to filter out one or more traffic vehicles that only momentarily have the potential to conflict or collide with ownship. In additional embodiments, other ownship or traffic information may also be used to filter out one or more traffic vehicles that pose momentary conflict or collision threats, or which would otherwise undesirably trigger the "Restricted" status.

Nevertheless, it will be appreciated that in other embodiments of "Restricted" determinations, combinations of one or more factors, such as the ground speed of ownship and one or more traffic vehicles, the airspeed of ownship and one or more traffic vehicles, the altitude of ownship and one or more traffic vehicles, the thrust settings of ownship and one or more traffic vehicles, as well as variation in these factors, may also be used to determine whether imminent or hazardous potential for ownship and traffic vehicle conflicts or collisions exist, and consequently, whether a runway is "Restricted." In other embodiments, these factors may be further combined with other relevant data, such as the power mode (e.g., on/standby) of the TCAS in one or more traffic vehicles and ownship, as well as the usage status of LAHSO, to ascertain whether a runway, or a runway portion, is "Restricted". Finally, it will also be appreciated that combinations of only one or some of the runway status described above, e.g., "Unoccupied", "Occupied", "In-use", "Not-in-Use", and "Restricted", may be implemented for display.

Figure 2:
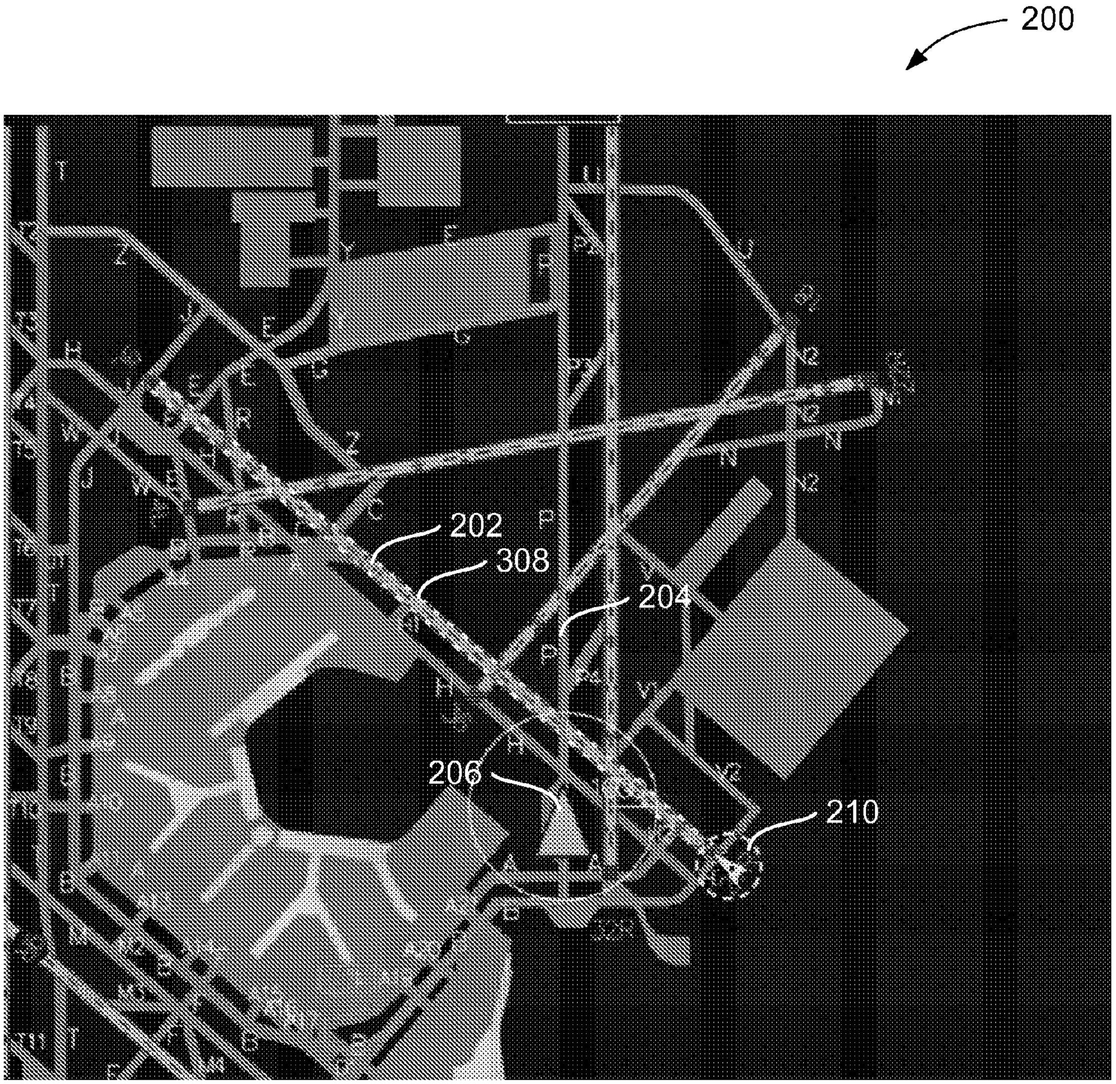
FIG. 2 illustrates a representative graphical status and traffic display showing an "Occupied" runway status in accordance with an embodiment of the invention.

FIG. 2 is a representative graphical status and traffic display 200 in accordance with an embodiment of the invention. Representative display 200 illustrates an "Occupied" runway status for a "next runway" 202 crossing a taxi route 204 of an aircraft 206. "Next runway" is defined as a runway that ownship is in a position to enter or cross as it taxis. Next runway may be based on a cleared taxi route or on the current taxiway segment as determined by ownship position. In this embodiment, the "Occupied" next runway is indicated with alternating white and colored dashed runway edge lines 208, and the associated aircraft traffic is displayed using symbology that includes a dashed circle 210.

Figure 3:
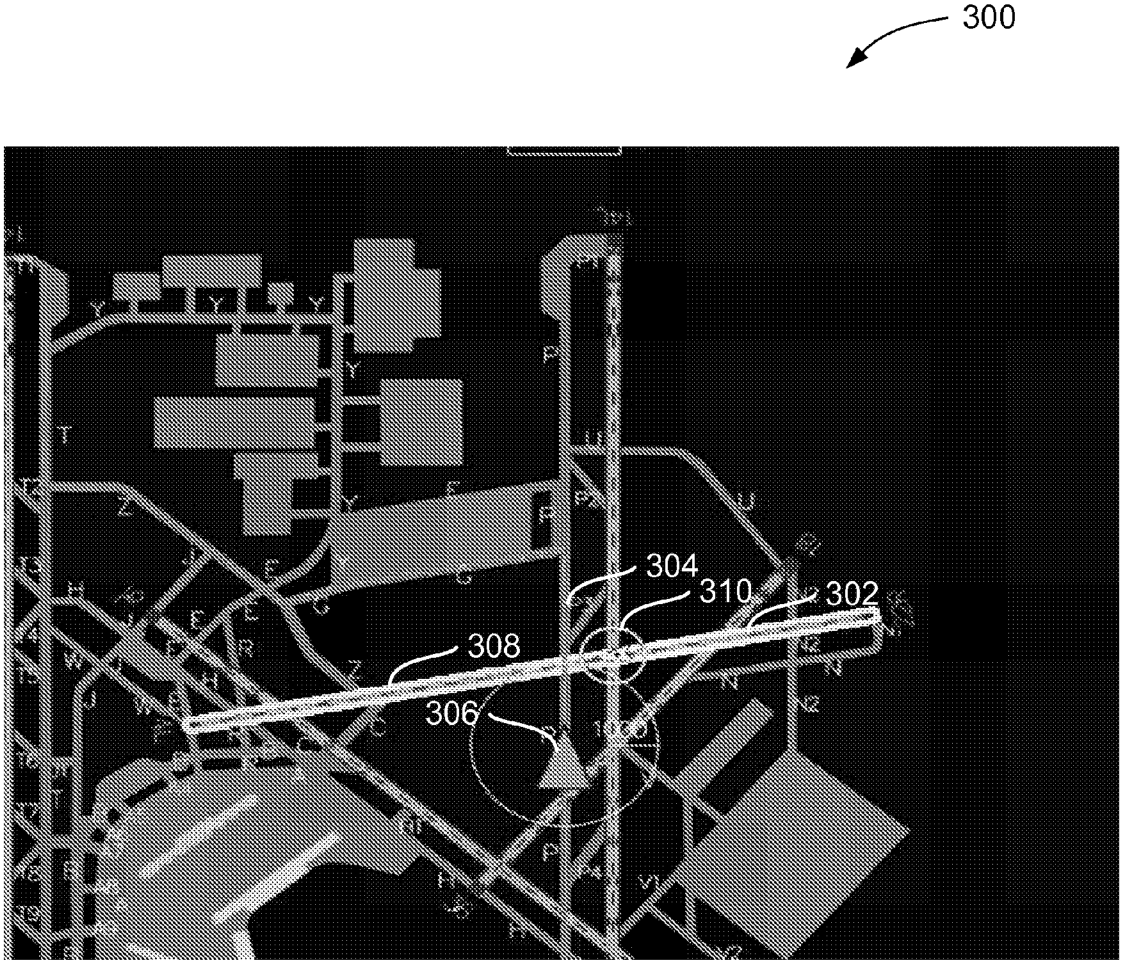
FIG. 3 illustrates a representative graphical status and traffic display in showing an "In-Use" runway status accordance with a second embodiment of the invention.

FIG. 3 is a representative graphical status display 300 in accordance with another embodiment of the invention. Representative status display 300 illustrates an "In-use" runway status for a "next runway" 302 crossing a taxi route 304 of an aircraft 306. The "In-use" runway is indicated with solid colored runway edge lines 308, and the associated traffic vehicle is displayed using symbology that includes a solid circle 310.

Figure 4:
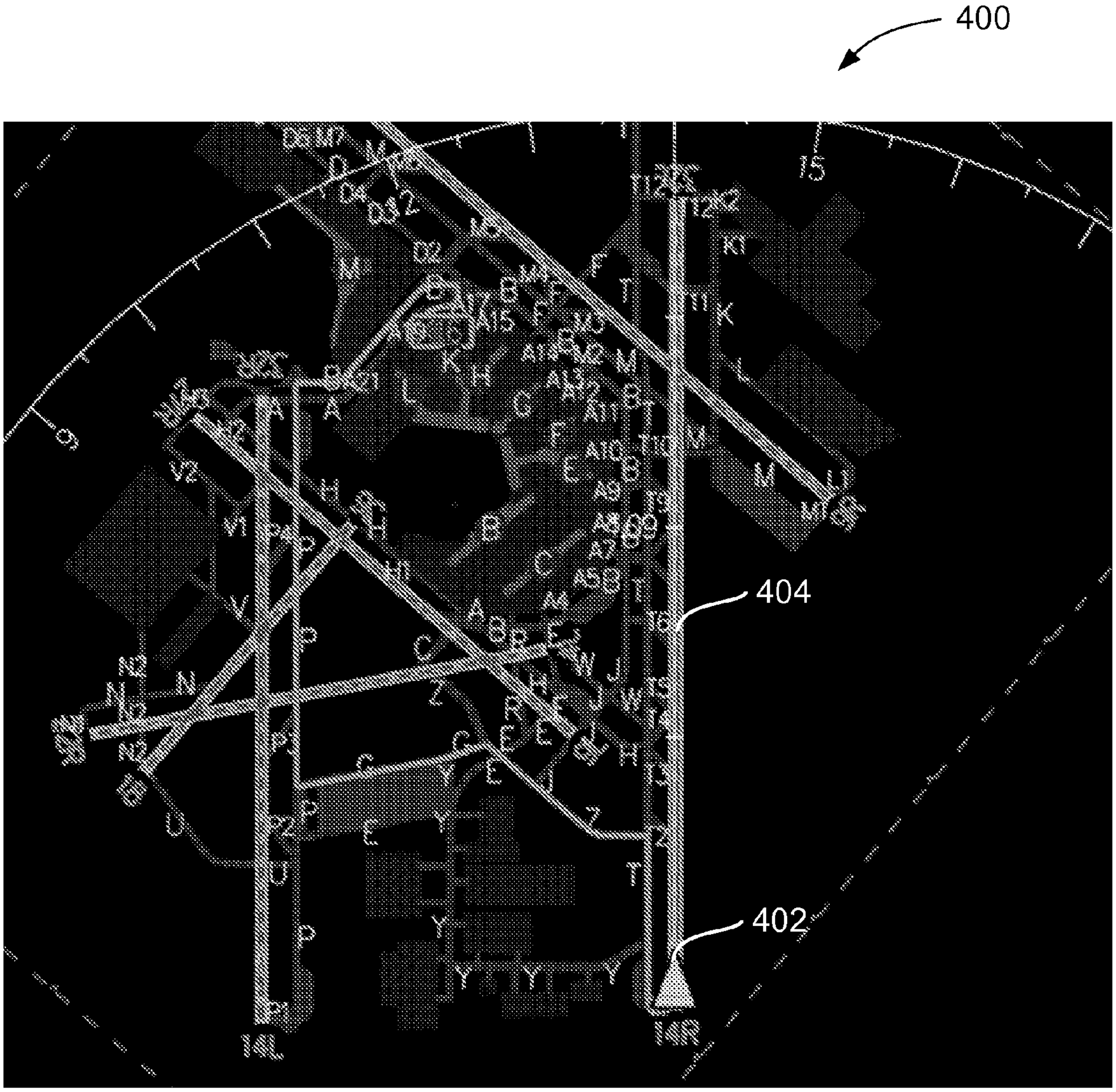
FIG. 4 illustrates a representative graphical status and traffic display showing an "Unoccupied" runway status in accordance with a third embodiment of the invention.

FIG. 4 is a representative graphical status display 400 in accordance with a further embodiment of the invention. The "Unoccupied" departure runway 402 of the aircraft 404 is represented by the absence of any runway status indication and traffic vehicle symbology. In addition, alphanumeric indication of runway status may be provided alone or in combination with the graphical display of runway status.

It will be appreciated that in further embodiments of the graphical status displays described above, as well in other graphical status displays in accordance with the present invention where runway status and associated one or more traffic vehicles are displayed, additional runway status indication patterns and colors may be employed. Moreover, other types of symbology, as well as variation in size, color or shape of symbology, may be used to indicate the correlation of a traffic vehicle with a particular runway status, indicate different types of traffic vehicle (e.g., aircraft vehicle vs. ground vehicle traffic), indicate the traffic vehicle state (e.g., on ground or airborne, accelerating or decelerating, on runway or not on runway, etc), and indicate the importance of the traffic vehicle to the ownship (e.g., hazardous, very hazardous, not hazardous, etc.), as well as indicate other relevant vehicle or operational information (e.g., cleared or not cleared to cross, land, takeoff, etc).

However, regardless of the particular embodiment, the color and shape coding of the runway status indication patterns and the associated traffic symbology are chosen and designed to be salient at all map ranges where a particular runway status (e.g., "Occupied", "In-Use", "Restricted", etc) is displayed. In addition, alphanumeric indication of runway status may be provided alone or in combination with the graphical display of a particular runway status. Additionally, aural indication(s) or annunciation(s) of runway status may also be provided alone or in conjunction with the graphical and alphanumerical indications in each embodiment.

Furthermore, in cases where a plurality of traffic vehicles are present in the same monitored volume of a corresponding runway, or in instances where a plurality of traffic vehicles are otherwise in conflict or potential conflict with ownship, an embodiment of the graphical status display in accordance with the invention may be configured to simultaneously display multiple runway status for the same runway using multiple runway status indications and traffic vehicle symbology.

Alternatively, in another embodiment, a graphical status display may also be configured to only display the highest priority runway status for the runway. For example, a "Restricted" runway resulting from a first traffic vehicle may be displayed instead of an "Occupied" status resulting from a second traffic vehicle, if a "Restricted" runway status is deemed to be a higher priority for a vehicle operator's attention than an "Occupied" runway status. In this embodiment, the graphic status display may also display a traffic vehicle symbology for each of the plurality of traffic vehicles that corresponds to each of the multiple runway status.

Finally, it will also be appreciated that other embodiments of the runway status indication system 100 may filter non-significant runway status and traffic information. Runway status may be displayed for (1) any runway ownship is on or using; (2) the next taxi runway or crossing runway that is part of the ownship's intended route during taxi; (3) the next runway intersecting the current taxiway or runway taxi segment; (4) the ownship runway; and (5) one or more runways intersecting the ownship runway. The runway status of any runway that does not fall into these categories may be filtered, that is, not displayed. In one embodiment, the filtering of runway status, or runway related traffic, may be controllable via a dedicated switch, control, or menu selection.

First, displaying status for "a runway ownship is on or using" means that a status is displayed for (1) a runway for which ownship is in the corresponding monitored volume for more than a predetermined time period, such as 5 seconds, or (2) a runway for which the ownship is in the corresponding monitored volume and the ownship's heading is within a predetermined number of degrees of the runway heading, such as 30 degrees.

The logic for determining whether a runway is "a runway ownship is on or using" is based primarily on ownship position within the monitored volume of the runway. Runway status for runways that ownship momentarily enters or crosses during taxi, takeoff, or landing are filtered using time, ownship heading, and other logical conditions to prevent nuisance indication or momentary flashing or display of runway status. It will be appreciated that for this purpose, the time period, the degrees of ownship heading, and other logical conditions may be adjusted or changed by design.

Second, displaying runway status for the "next taxi runway or crossing runway that is part of ownship's intended route during taxi" means that a status is displayed for a runway that is explicitly defined or listed in an ownship's electronically cleared or displayed taxi route, or which intersects ownship's electronically cleared or displayed taxi route. Runways in this category potentially include runways used for taxi, runways intersecting the taxi route, and the takeoff runway. In this embodiment, the determination that a runway is the next taxi runway or crossing runway is route dependent. Nonetheless, if the ownship deviates from its electronically cleared or displayed route, runway status indication latches (or otherwise remains displayed) for a runway that intersects the route segment ownship is currently on until ownship enters and exits the corresponding monitored volume, or until ownship enters an electronically cleared or displayed route segment beyond that intersection, or until the ownship is in the air. However, in another embodiment, additional runways may be designated as "next taxi runways or crossing runways that are part of the ownship's intended route during taxi" if a logic algorithm determines that ownship is on-ground, the speed of the ownship is less than a predetermined ground speed, and the ownship's thrust is less than a predetermined percentage of the total capable thrust, such as less than 80%. Therefore, the determination that a runway is the next taxi runway or crossing runway is part of the ownship's taxi route is route dependent.

Third, displaying the runway status for the "next runway intersecting the current taxiway or runway taxi segment" means that a status is displayed for a next runway intersecting the taxiway or runway ownship is currently on. This occurs when no electronically cleared or displayed taxi route exists, or when ownship deviates from its electronically cleared or displayed route. In such a case, a route independent logic provides runway status indications. As a result, runway status is displayed for the "next runway intersecting the current taxiway or runway taxi segment" until ownship enters and exits the monitored volume corresponding to the "next runway", or until ownship enters/exits onto some other taxiway or runway segment, or until ownship enters onto an electronically displayed route segment, or until ownship is in the air, or until some other logical condition is met. In other words, route independent runway status indication is generally displayed for the next runway that intersects the taxiway, runway, or other database route segment ownship is currently occupying.

Fourth, displaying the runway status for an "ownship runway" includes displaying the runway status for a runway that is (1) a landing runway explicitly displayed first in ownship's route list; (2) a runway listed in the ownship's flight management computer (FMC) as a departure or landing runway; or (3) a runway for which ownship is in the corresponding monitored volume and ownship's heading is within a predetermined degrees of the runway heading. In one embodiment, the ownship's heading is within 30 degrees of the runway heading. However, the degrees may be adjusted. In other embodiments, additional logical conditions may be included to designate an "ownship runway."

Moreover, other runways may be determined to be "ownship runways" in several instances. In one embodiment, a landing runway is an "ownship runway" if ownship is airborne on approach, the landing runway is in ownship's electronic taxi route list or FMC, and the ownship speed is greater than a predetermined level. In another embodiment, a runway is an "ownship runway" if the ownship is on ground, within a corresponding monitored volume of the runway, and ownship thrust is greater than a predetermined percentage of the total selectable thrust, such as greater than 80%, and ownship speed is greater than a predetermined level. In a third embodiment, a runway is an "ownship runway" if ownship is in a monitored volume corresponding to the runway for approach or landing, and the ownship's heading is within a predetermined degrees of the runway heading, such as 30 degrees, and ownship speed is greater than a predetermined level. In these embodiments, the runway status will be displayed for each runway that is an "ownship runway."

Fifth, displaying the runway status for a "runway intersecting ownship runway" means that the status for a runway intersecting an "ownship runway" is displayed when an ownship is on approach, landing or takeoff, and the runway crossing or intersecting the "ownship runway" is "In-use," "Occupied," or "Restricted" as a result of one or more traffic vehicles traveling at greater than some predetermined speed, such as 5 knots for "Occupied," or "In-use", or such as 50 kts for "Restricted".

Embodiments of systems and methods in accordance with the present invention may provide significant advantages over the prior art. For example, because the runway status indication system 100 of the present invention can provide a quick, easy and unambiguous way to reliably determine runway status and potential traffic conflicts, the system advantageously increases safety for all airport vehicles.

Figure 5:
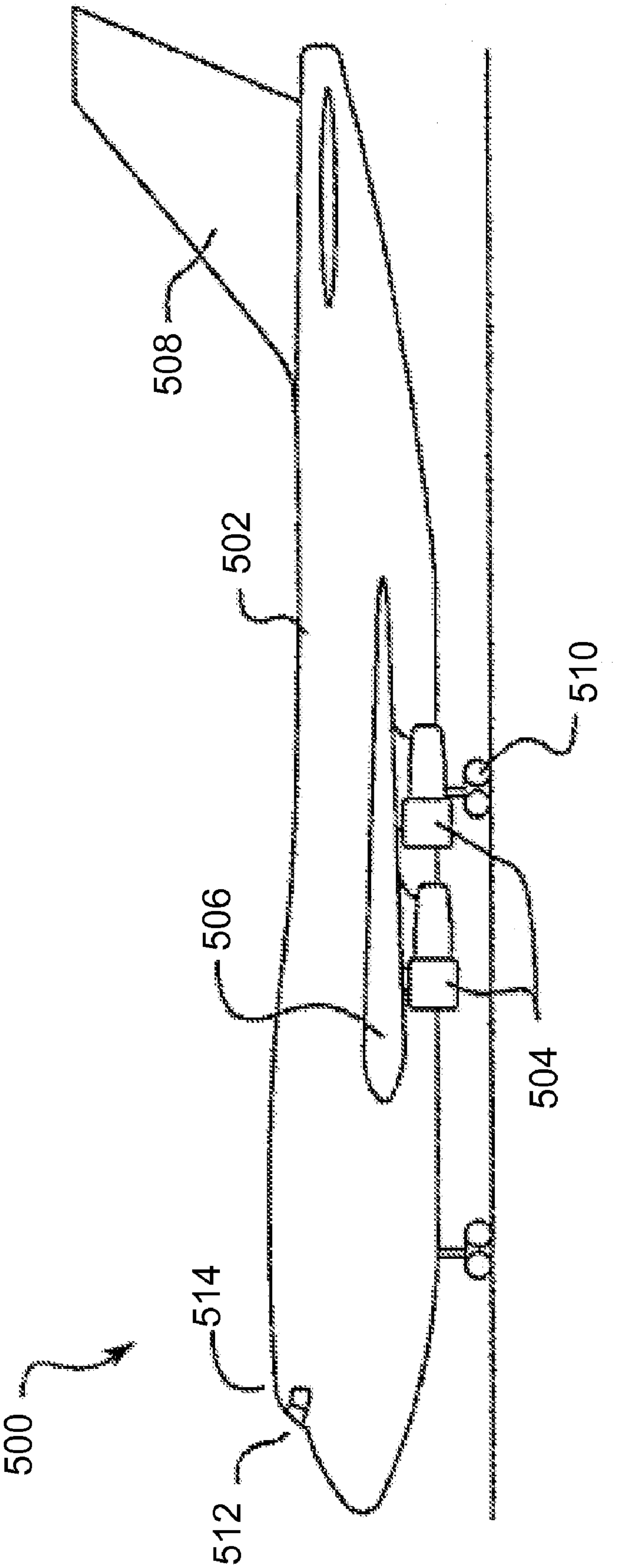
FIG. 5 is a side elevational view of an aircraft in accordance with another embodiment of the invention.

Embodiments of the present invention may also be used in a wide variety of vehicles, including aircraft, ships, trains, and any other suitable vehicle. For example, FIG. 5 is a side elevational view of an aircraft 500 in accordance with an embodiment of the present invention. In general, except for one or more systems in accordance with the present invention, the various components and subsystems of the aircraft 500 may be of known construction and, for the sake of brevity, will not be described in detail herein. As shown in FIG. 5, the aircraft 500 includes one or more propulsion units 504 coupled to a fuselage 502, a cockpit 512 in the fuselage 502, wing assemblies 506 (or other lifting surfaces), a tail assembly 508, a landing assembly 510, a control system (not visible), and a host of other systems and subsystems that enable proper operation of the aircraft 500. At least one component of the runway status indication system 514 formed in accordance with the present invention is located within the fuselage 502. However, components of the system 514 may be distributed throughout the various portions of the aircraft 500.

Although the aircraft 500 shown in FIG. 5 is generally representative of a commercial passenger aircraft, including, for example, the 737, 747, 757, 767, 777, and 787 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of system and methods in accordance with the present invention may be utilized in other manned aerial vehicles.

It will be appreciated that a variety of embodiments in accordance with the present invention may be conceived, and that the invention is not limited to the particular embodiments described above and shown in the accompanying figures. Therefore, while embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A method for presenting runway status, comprising:

defining a monitored volume for each of one or more runways;

determining, by one or more computer processors, a runway status for each of the one or more runways based on at least one of a state of at least one traffic vehicle and a monitoring vehicle state with respect to each monitored volume;

selecting, by the one or more computer processors, at least one runway status for display based on the state of the monitoring vehicle; and presenting, by the one or more computer processors, the at least one runway status within the monitoring vehicle.

2. The method of claim 1, wherein each monitored volume is based on a length of a corresponding runway, a width of the corresponding runway, and a predetermined altitude above the corresponding runway.

3. The method of claim 1, wherein determining a runway status for each of the one or more runways based on at least one of a state of at least one traffic vehicle and the monitored vehicle state includes determining a runway status based on at least one of a position of the at least one traffic vehicle in a corresponding monitored volume, a speed, a heading, an altitude, a thrust, a track, and a travel of the at least one traffic vehicle.

4. The method of claim 2, wherein the position of the at least one traffic vehicle is based on one of an operator eye reference point location in the at least one traffic vehicle, a center of gravity location of the at least one traffic vehicle, and an imaginary envelope encompassing one or more most distal points of the at least one traffic vehicle.

5. The method of claim 1, wherein determining a runway status for each of the one or more runways based on at least one of a state of at least one traffic vehicle and a monitoring vehicle state includes determining a runway status based on at least one of a position of the monitoring vehicle in a corresponding monitored volume, a speed, a heading, an altitude, a thrust, a track, and a travel of the monitoring vehicle.

6. The method of claim 5, wherein the position of the monitoring vehicle is based on one of an operator eye reference point location in the monitoring vehicle, a center of gravity location of the monitoring vehicle, and an imaginary envelope encompassing one or more most distal points of the monitoring vehicle.

7. The method of claim 1, wherein determining a runway status for each of the one or more runways includes determining the state of the at least one traffic vehicle based on at least one of automatic surveillance traffic information, air traffic control radar information, ground vehicle traffic information, and airport map database information.

8. The method of claim 1, wherein presenting the at least one runway status includes at least one of providing an aural signal corresponding to the at least one runway status, displaying the at least one runway status by at least one of a corresponding graphical indicator and a corresponding alphanumeric indicator, and displaying each of one or more traffic vehicles associated with the at least one runway status by a corresponding symbology.

9. A system for presenting runway status, comprising:

an evaluator component configured to determine a runway status for each of one or more runways based on at least one of a state of at least one traffic vehicle and a monitoring vehicle state with respect to a corresponding monitored volume;

a selector component configured to select at least one runway status for display; and a presentation component configured to present the at least one runway status within the monitoring vehicle.

10. The system of claim 9, wherein the monitored volume is based on a length of a corresponding runway, a width of the corresponding runway, and a predetermined altitude above the corresponding runway.

11. The system of claim 9, wherein the state of the at least one traffic vehicle includes at least one of a position of the at least one traffic vehicle in a corresponding monitored volume, a speed, a heading, an altitude, a thrust, a track, and a travel of the at least one traffic vehicle, and the monitoring vehicle state includes at least one of a position of the monitoring vehicle in a corresponding monitored volume, a speed, a heading, an altitude, a thrust, a track, and a travel of the monitoring vehicle.

12. The system of claim 11, wherein the position of the at least one traffic vehicle is based on one of an operator eye reference point location in the at least one traffic vehicle, a center of gravity location of the at least one traffic vehicle, and an imaginary envelope encompassing one or more most distal points of the at least one traffic vehicle, and wherein the position of the monitoring vehicle is based on one of an operator eye reference point location in the monitoring vehicle, a center of gravity location of the monitoring vehicle, and an imaginary envelope encompassing one or more most distal points of the monitoring vehicle.

13. The system of claim 9, wherein the evaluator component is further configured to determine a runway status for each of the one or more runways based on at least one of automatic surveillance traffic information, air traffic control radar information, ground vehicle traffic information, and airport map database information.

14. The system of claim 9, wherein the presentation component is further configured to present the at least one runway status by at least one of provide an aural signal corresponding to the at least one runway status, display the at least one runway status by at least one of a corresponding graphical indicator and a corresponding alphanumeric indicator, and display each of one or more traffic vehicles associated with the runway status by a corresponding symbology.

15. An aircraft comprising:

a fuselage;

a propulsion system operatively coupled to the fuselage; and at least one system for presenting runway status at least partially disposed within the fuselage, the system comprising:

an evaluator component configured to determine a runway status for each of one or more runways based on at least one of a state of one or more traffic vehicles and the a monitoring vehicle state with respect to each monitored volume;

a selector component configured to select at least one runway status for display; and a presentation component configured to present the at least one runway status within the monitoring vehicle.

16. The aircraft of claim 15, wherein each monitored volume is based on a length of a corresponding runway, a width of the corresponding runway, and a predetermined altitude above the corresponding runway.

17. The aircraft of claim 15, wherein the state of the at least one traffic vehicle includes at least one of a position of the at least one traffic vehicle in a corresponding monitored volume, a speed, a heading, an altitude, a thrust, a track, and a travel of the at least one traffic vehicle, and the monitoring vehicle state includes at least one of a position of the monitoring vehicle in a corresponding monitored volume, a speed, a heading, an altitude, a thrust, a track, and a travel of the monitoring vehicle.

18. The aircraft of claim 17, wherein the position of the at least one traffic vehicle is based on one of an operator eye reference point location in the at least one traffic vehicle, a center of gravity location of the at least one traffic vehicle, and an imaginary envelope encompassing one or more most distal points of the at least one traffic vehicle, and wherein the position of the monitoring vehicle is based on one of an operator eye reference point location in the monitoring vehicle, a center of gravity location of the monitoring vehicle, and an imaginary envelope encompassing one or more most distal points of the monitoring vehicle.

19. The aircraft of claim 15, wherein the evaluator component is further configured to determine a runway status for each of the one or more runways based on at least one of automatic surveillance traffic information, air traffic control radar information, ground vehicle traffic information, and airport map database information.

20. The aircraft of claim 15, wherein the presentation component is further configured to present the at least one runway status by at least one of provide an aural signal corresponding to the at least one runway status, display the at least one runway status by at least one of a corresponding graphical indicator and a corresponding alphanumeric indicator, and display each of one or more traffic vehicles associated with the runway status by a corresponding symbology.

* * * * *